United States Patent
Miura et al.

(10) Patent No.: US 11,474,711 B2
(45) Date of Patent: Oct. 18, 2022

(54) CIRCUIT DEVICE, ELECTRONIC DEVICE, AND MOBILE BODY

(71) Applicant: SEIKO EPSON CORPORATION, Tokyo (JP)

(72) Inventors: Masahiko Miura, Chino (JP); Yuichi Hiwasa, Chino (JP); Hironori Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 685 days.

(21) Appl. No.: 16/423,265

(22) Filed: May 28, 2019

(65) Prior Publication Data

US 2019/0369884 A1 Dec. 5, 2019

(30) Foreign Application Priority Data

May 29, 2018 (JP) .............................. JP2018-102169

(51) Int. Cl.
*G06F 11/00* (2006.01)
*G06F 3/06* (2006.01)
*G06F 11/07* (2006.01)

(52) U.S. Cl.
CPC .......... *G06F 3/0622* (2013.01); *G06F 3/0619* (2013.01); *G06F 3/0659* (2013.01); *G06F 3/0679* (2013.01); *G06F 11/0727* (2013.01); *G06F 11/0751* (2013.01)

(58) Field of Classification Search
CPC ............. G06F 11/0727; G06F 11/0751; G06F 11/1056; G06F 11/106; G06F 11/1068; G06F 3/0622; G06F 3/0619; G06F 3/0659; G06F 3/0679; G06F 21/62; G06F 21/71; G11C 29/022; G11C 29/38; G11C 29/44; G11C 29/1201; G11C 2029/4402; G11C 2029/0401
USPC ...................................................... 714/1–57
See application file for complete search history.

(56) References Cited

U.S. PATENT DOCUMENTS

| | | | |
|---|---|---|---|
| 2003/0126516 A1* | 7/2003 | Komarla ............... | G06F 11/073 714/45 |
| 2003/0135790 A1* | 7/2003 | Pignol ................. | G06F 11/1641 714/38.13 |
| 2004/0193948 A1 | 9/2004 | Ono | |

(Continued)

FOREIGN PATENT DOCUMENTS

| | | |
|---|---|---|
| JP | 2003-345733 A | 12/2003 |
| JP | 2004-220580 A | 8/2004 |

(Continued)

*Primary Examiner* — Sarai E Butler
(74) *Attorney, Agent, or Firm* — Rankin, Hill & Clark LLP (57) ABSTRACT

A circuit device 10 includes a register 30, an access control circuit 20 that controls access to a nonvolatile memory 70 and loads setting data of the circuit device 10 stored in the nonvolatile memory 70 in the register 30, and an error detection circuit 40. The access control circuit 20 performs a refresh operation that reloads the setting data stored in the nonvolatile memory 70 in the register 30. The error detection circuit 40 reads data for comparison that has been reloaded in the register 30 from the register 30, compares the data for comparison that was read with an expected value of the data for comparison, and performs access control error detection based on the comparison result.

20 Claims, 8 Drawing Sheets

(56) References Cited

U.S. PATENT DOCUMENTS

| | | | |
|---|---|---|---|
| 2005/0240806 A1* | 10/2005 | Bruckert | G06F 11/1658 714/6.11 |
| 2006/0017716 A1* | 1/2006 | Aoki | G09G 3/3275 345/204 |
| 2007/0255934 A1* | 11/2007 | Dennis | G06F 11/1417 713/1 |
| 2012/0117418 A1* | 5/2012 | Gilbert | G06F 11/1044 714/6.22 |
| 2012/0239256 A1* | 9/2012 | Hammerschmidt | G06F 11/076 701/45 |
| 2013/0016574 A1* | 1/2013 | Kim | G11C 29/50016 365/201 |
| 2013/0185606 A1* | 7/2013 | Fai | G06F 11/106 714/704 |
| 2014/0195874 A1* | 7/2014 | Yao | G06F 11/1048 714/763 |
| 2014/0380096 A1* | 12/2014 | Dodson | G11C 29/52 714/16 |
| 2015/0236696 A1* | 8/2015 | Saen | G06F 11/183 326/10 |
| 2018/0011754 A1* | 1/2018 | Kwon | G06F 11/1048 |

FOREIGN PATENT DOCUMENTS

| | | |
|---|---|---|
| JP | 2010-117506 | 5/2010 |
| JP | 2010-127829 A | 6/2010 |

* cited by examiner

| NOT WRITTEN | INITIAL VALUE | 00h |
|---|---|---|
| FIRST TIME | BANK 1 | 81h |
| SECOND TIME | BANK 2 | C3h |
| THIRD TIME | BANK 3 | E7h |

CIRCUIT DEVICE, ELECTRONIC DEVICE, AND MOBILE BODY

The present application is based on, and claims priority from JP Application Serial Number 2018-102169, filed May 29, 2018, the disclosure of which is hereby incorporated by reference herein in its entirety.

BACKGROUND

1. Technical Field

The present disclosure relates to a circuit device, an electronic device, and a mobile body, for example.

2. Related Art

As an existing technology of a circuit device that detects an abnormality, there is the technology disclosed in JP-A-2010-127829, for example. In the circuit device of JP-A-2010-127829, a detection circuit that detects an abnormality includes a reference holding circuit that holds reference data, an equivalent holding circuit that holds equivalent data that is substantially equal to the reference data, and a comparison circuit that compares the reference data with the equivalent data. The detection circuit generates a detection signal that indicates whether or not the reference data is abnormal based on the comparison result of the comparison circuit. Specifically, in the circuit device of JP-A-2010-127829, reference data that has been input from an external processing device through a system interface circuit is held in the reference holding circuit, and an abnormality is detected by comparing the reference data with the equivalent data.

In this sort of circuit device, a refresh operation is performed that writes data stored in an external nonvolatile memory to a register. This refresh operation is realized by an access control circuit that controls access to the nonvolatile memory. However, if a malfunction occurs in the nonvolatile memory or the access control circuit, or a connection failure such as disconnection occurs in a signal line that performs access control, the refresh operation is not executed normally, resulting in a malfunction or the like of the circuit device.

SUMMARY

One aspect of the disclosure relates to a circuit device that includes a register, an access control circuit that controls access to a nonvolatile memory and loads setting data of the circuit device stored in the nonvolatile memory in the register, and an error detection circuit. The access control circuit performs a refresh operation that reloads the setting data stored in the nonvolatile memory in the register. The error detection circuit reads data for comparison that has been reloaded in the register from the register, compares the data for comparison that was read with an expected value of the data for comparison, and performs access control error detection based on the comparison result.

Also, in one aspect of the disclosure, the access control circuit may stop the refresh operation when an error has been detected in the access control.

Also, in one aspect of the disclosure, a configuration may be adopted in which the circuit device includes an interface circuit where external device setting data that was output by an external device is input, and a selector that selects any of setting data that was read from the nonvolatile memory by the access control circuit and external device setting data that was input to the interface circuit, and outputs the selected data to the register. When an error has been detected in the access control, the selector selects the external device setting data that was input to the interface circuit.

Also, in one aspect of the disclosure, a configuration may be adopted in which the circuit device includes an error output terminal that outputs an error detection signal to the external device, the register stores error status information, and the interface circuit outputs the error status information to the external device.

Also, in one aspect of the disclosure, the data for comparison may be data set to a different value according to the number of times of writing the setting data to the nonvolatile memory.

Also, in one aspect of the disclosure, the error detection circuit may judge that an error has occurred in the access control when determined a plurality of times that the data for comparison and the expected value of the data for comparison do not match.

Also, in one aspect of the disclosure, a configuration may be adopted in which the nonvolatile memory stores first data for comparison as the data for comparison, and stores first to k-th setting data, k being an integer of 2 or more, as the setting data. In the refresh operation, the access control circuit reloads the first data for comparison from the nonvolatile memory to the register, and after reloading the first data for comparison, reloads the first to k-th setting data from the nonvolatile memory to the register. The error detection circuit compares the first data for comparison that has been reloaded in the register with the expected value of the first data for comparison.

Also, in one aspect of the disclosure, a configuration may be adopted in which the nonvolatile memory stores second data for comparison, in the refresh operation, the access control circuit reloads the second data for comparison from the nonvolatile memory to the register after the first to k-th setting data are reloaded, and the error detection circuit compares the second data for comparison that has been reloaded in the register with the expected value of the second data for comparison.

Also, in one aspect of the disclosure, a configuration may be adopted in which the nonvolatile memory stores, as the data for comparison, first data and second data having a different value than the first data, and the access control circuit, in a first refresh operation that is the refresh operation, reloads the first data from the nonvolatile memory to the register, and in a second refresh operation after the first refresh operation, reloads the second data from the nonvolatile memory to the register. The error detection circuit compares the first data with the expected value of the first data when the first data has been reloaded in the register, and compares the second data with the expected value of the second data when the second data has been reloaded in the register.

Also, in one aspect of the disclosure, a configuration may be adopted in which the circuit device includes a drive circuit that drives an electro-optical panel, and the setting data includes setting data for driving the electro-optical panel.

Also, another aspect of the disclosure relates to an electronic device including the above-described circuit device.

Also, another aspect of the disclosure relates to a mobile body including the above-described circuit device.

DESCRIPTION OF EXEMPLARY EMBODIMENTS

The following describes exemplary embodiments of the disclosure. Note that the embodiments described below do not unreasonably limit the scope of the disclosure described in the claims, and not all of the configurations described in these embodiments are necessary to solve problems addressed by the disclosure.

1. Circuit Device

Figure 1:
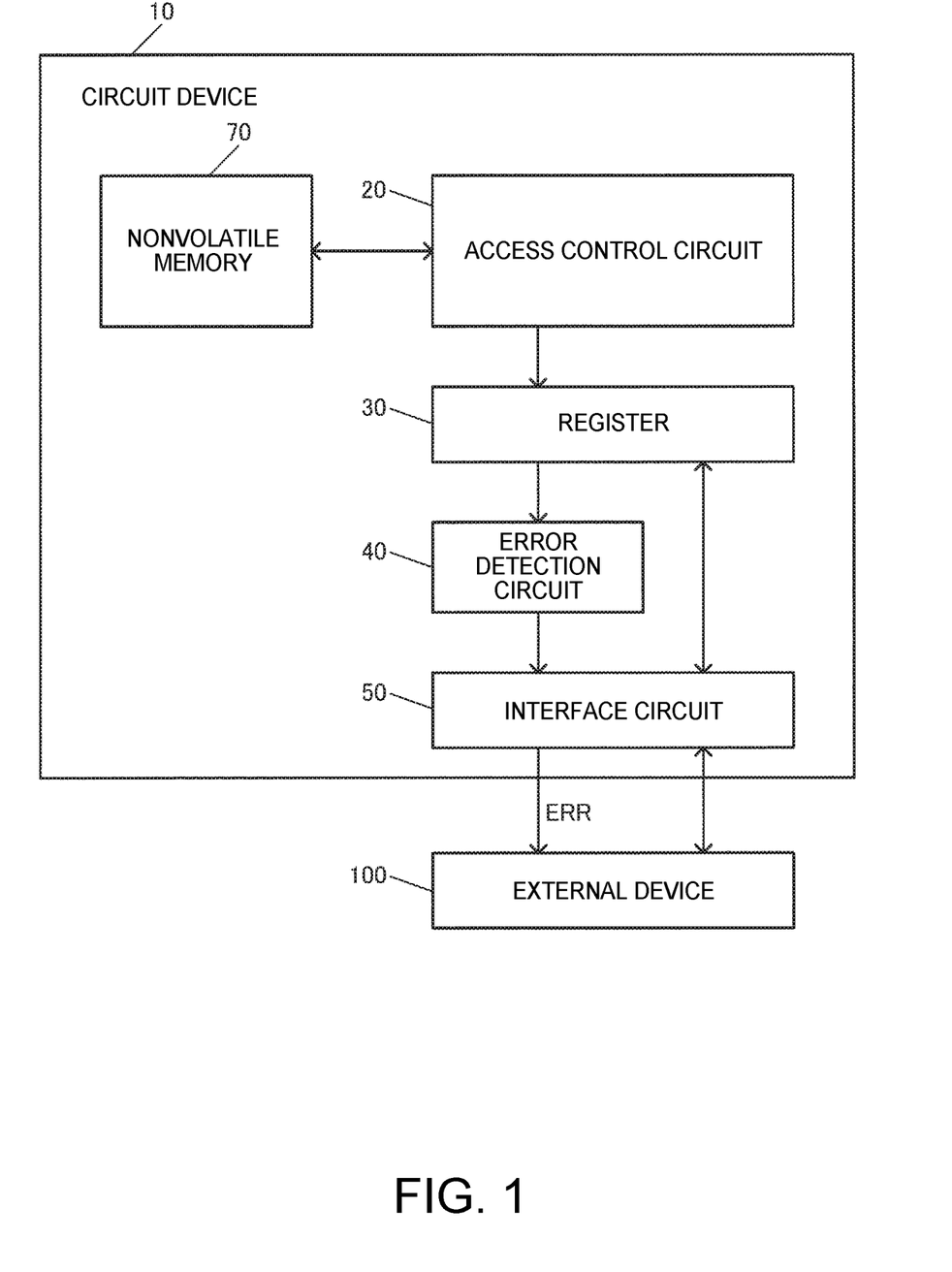
FIG. 1 shows a configuration example of a circuit device of the present embodiment.

FIG. 1 shows a configuration example of a circuit device 10 of the present embodiment. The circuit device 10, which is an integrated circuit device (IC), includes an access control circuit 20, a register 30, and an error detection circuit 40. The circuit device 10 can also include an interface circuit 50 and a nonvolatile memory 70. Note that the nonvolatile memory 70 may be an external memory provided outside of the circuit device 10.

The register 30 stores various data, and can be realized by, for example, a flip-flop circuit or a RAM (random access memory). The access control circuit 20 is a circuit that controls access to the nonvolatile memory 70. The access control is control of reading data from the nonvolatile memory 70, control of writing data to the nonvolatile memory 70, and the like. Specifically, the access control circuit 20 controls loading of setting data of the circuit device 10 stored in the nonvolatile memory 70 in the register 30. For example, when power to the circuit device 10 is turned on, the access control circuit 20 performs a loading operation of reading the setting data stored in the nonvolatile memory 70 and writing this data in the register 30. The setting data is data for setting the operation and state of the circuit device 10. For example, the setting data is setting data of a command that instructs operation of the circuit device 10, such as data to be written in a command register 32 in FIG. 2 to be described later. For example, the setting data can include an operation sequence of a circuit block of the circuit device 10, or data that sets an operation parameter. Specifically, the setting data can include data that indicates an operation sequence describing how the circuit block operates after power is turned on, setting data of a command to be issued to the circuit block, data that sets a voltage generated by the circuit block or an electric current value, and the like.

An error detection circuit 40 is a circuit that performs error detection of the circuit device 10, and detects a malfunction state such as an abnormal state of the circuit device 10. More specifically, the error detection circuit 40 detects an error in the access control of the nonvolatile memory 70. Detection of an error in the access control means detecting whether or not there is an abnormality in the access control by the access control circuit 20. An access control error is an auto-refresh malfunction, for example. The auto-refresh malfunction is a malfunction of the access control circuit 20 that performs the auto-refresh or a malfunction of the nonvolatile memory 70, or a state in which due to a connection failure such as disconnection of an access control signal line, it is not possible to periodically reload a register value, which is setting data from the nonvolatile memory 70, in the register 30. The error detection circuit 40 detects an auto-refresh malfunction, which is this sort of access control error.

The interface circuit 50 is a circuit that performs interface processing of communications with an external device 100. The interface circuit 50 can be realized by a serial interface circuit such as an SPI (Serial Peripheral Interface) or I2C (Inter-Integrated Circuit), for example. Alternatively, the interface circuit 50 may be realized by a circuit using differential signals, called LVDS (low voltage differential signaling). Data from the external device 100 is input to the circuit device 10 from the external device 100 through the interface circuit 50. Data to the external device 100 is output from the circuit device 10 to the external device 100 through the interface circuit 50. The external device 100 is, for example, a display controller 110 in FIG. 3 described later, and is, for example, an MPU (Micro-Processor Unit) or the like serving as a host. The interface circuit 50 realizes, for example, an MPU interface between the circuit device 10 and the external device 100.

The nonvolatile memory 70 is a nonvolatile storage device, and is a device that can hold and store data even when power is not supplied. The nonvolatile memory 70 has a plurality of word lines, a plurality of bit lines, and a plurality of memory cells. The access control circuit 20 can include a word line selection circuit that selects a word line, a read control circuit that controls reading of data from the memory cells, and a write control circuit that controls writing of data to the memory cells. The read control circuit includes a sense amplifier coupled to the bit lines. By the access control circuit 20 performing a word line selection operation, a signal corresponding to data stored in a memory cell coupled to a word line is output to a bit line. The nonvolatile memory 70 is, for example, an OTP (One Time Programmable) device. As the nonvolatile memory 70, for example, a FAMOS (floating gate avalanche injection MOS) or the like can be used. A FAMOS is a memory of a system in which charges are accumulated in a floating gate by avalanche injection. Alternatively, the nonvolatile memory 70 may be an EEPROM (Electrically Erasable Programmable Read-Only Memory) capable of electrically erasing data. Alternatively, the nonvolatile memory 70 may be a memory using a fuse cell. In this type of memory, a fuse cell serving as a memory cell includes a resistor element, and a selector element coupled in series to the resistor element. The selector element is, for example, a diode of a PN junction. However, the selector element may also be a MOS transistor. For example, one end of the resistor element is coupled to a bit line, and the other end of the resistor element is coupled to an anode of the diode. A cathode of the diode is coupled to a word line. A resistor element functioning as a fuse element is a programmable resistor whose resistance value is variable. For example, the resistor element has a poly resistor having a high resistance value, and a silicide formed in an upper layer of the poly resistor and having a low resistance value. By flowing a large amount of current through the silicide, the silicide is fused and the resistance value of the resistor element is changed from a low resistance value to a high resistance value, thus storing data in the fuse cell, which is a memory cell.

As described above, the circuit device 10 of the present embodiment includes the register 30, the access control circuit 20 that controls access to the nonvolatile memory 70 and loads the setting data of the circuit device 10 stored in the nonvolatile memory 70 in the register 30, and the error detection circuit 40. As an initial operation after turning on power to the circuit device 10, for example, the access control circuit 20 performs an operation of loading the setting data stored in the nonvolatile memory 70 in the register 30. In the nonvolatile memory 70, setting data is written at the time of inspection and shipping of the circuit device 10, or products of an electronic device 300 or an electro-optical device 160 in FIG. 9 that include the circuit device 10, for example. In the case of the nonvolatile memory 70 using the above-described fuse cell, the fuse element is fused at the time of inspection and shipping of the product.

The access control circuit 20 performs a refresh operation that reloads the setting data stored in the nonvolatile memory 70 in the register 30. That is, after loading the setting data as described above, the access control circuit 20 performs the refresh operation to again load the setting data in the register 30. The refresh operation is an operation of overwriting and refreshing the setting data by performing a reload operation that again loads the setting data in the register 30 where the setting data is loaded. For example, auto-refreshing that periodically performs a refresh operation is a mechanism whereby, even when the register value of the register 30 is rewritten due to sudden external noise, power fluctuation, or the like, the register value is periodically reloaded from the nonvolatile memory 70, and the auto-refreshing always operates in a normal state. Taking the circuit device 10 of a display driver as an example, a refresh operation is performed for each of one or a plurality of vertical synchronization periods. Alternatively, it is possible to adopt a modified embodiment in which a refresh operation is performed irregularly. For example, the access control circuit 20 may perform a refresh operation based on an instruction from the external device 100.

Then, the error detection circuit 40 reads data for comparison that has been reloaded in the register 30 from the register 30. The error detection circuit 40 compares the data for comparison that was read with an expected value of the data for comparison, and performs access control error detection based on the comparison result. Here, the expected value is being held in the error detection circuit 40 as fixed data having the same value as the data for comparison. Specifically, the error detection circuit 40 judges whether or not the data for comparison matches the expected value, and judges that the access control is normal when they match, and judges that an error has occurred in the access control when they do not match. For example, the expected value of the data for comparison is being held in the error detection circuit 40. For example, the expected value is held in a hold mode that is maintained even when power is not supplied. Specifically, the expected value can be held using a combination circuit within the error detection circuit 40. This combination circuit can be realized by an exclusive OR circuit called an EXOR, for example. For example, when the expected value is data of i bits, i being an integer of 1 or more, the combination circuit can include a plurality of exclusive OR circuits in which each exclusive OR circuit is provided corresponding to each bit of data of the expected value. A first input of each exclusive OR circuit is set to an L level or an H level, which are voltage levels corresponding to the logic level of each bit of data of the expected value. A voltage level corresponding to the logic level of each bit of the setting data that was read from the register 30 is input to a second input of each exclusive OR circuit. Based on an output signal of these exclusive OR circuits, the error detection circuit 40 judges whether or not the data for comparison matches the expected value, and when they match, the access control is judged to be normal. On the other hand, when the data for comparison and the expected value do not match, it is judged that there is an error in the access control. For example, when the error detection circuit 40 detects that there is an error in the access control, an error detection signal ERR is generated. Notification of this error detection signal ERR is sent to the external device 100 through the interface circuit 50, for example. Thus, the external device 100 can detect that an error occurred in the access control of the nonvolatile memory 70 by the access control circuit 20.

In the present embodiment, a refresh operation that reloads the setting data of the circuit device 10 from the nonvolatile memory 70 to the register 30 is performed. Therefore, even when data corruption occurs in which the register value of the register 30 is rewritten due to external noise, power fluctuation, or the like, the register value of the register 30 can be refreshed to an appropriate value by performing the refresh operation. However, there are cases where a malfunction occurs in a circuit block of the nonvolatile memory 70, the access control circuit 20, or the like, and cases where a connection failure occurs, such as disconnection in the signal line between the nonvolatile memory 70 and the access control circuit 20 or in the signal line between the access control circuit 20 and the register 30. When such a malfunction or connection failure occurs, it is not possible to refresh the register value of the register 30 to an appropriate value even when the refresh operation is performed. Accordingly, when the circuit device 10 is operated based on the setting data that was read from the register 30, a problem such as a malfunction is caused.

Regarding this point, in the present embodiment, the error detection circuit 40 compares the data for comparison reloaded in the register 30 with the expected value of that data, and performs access control error detection based on the comparison result. Therefore, when a malfunction occurs in the nonvolatile memory 70, the access control circuit 20, or the like, or a connection failure such as disconnection occurs in a signal line, it is possible to detect an error in the access control due to this malfunction or connection failure. By notifying the external device 100 that this access control error has been detected, for example, using the error detection signal ERR or the like, it is possible to appropriately respond to such access control.

Figure 2:
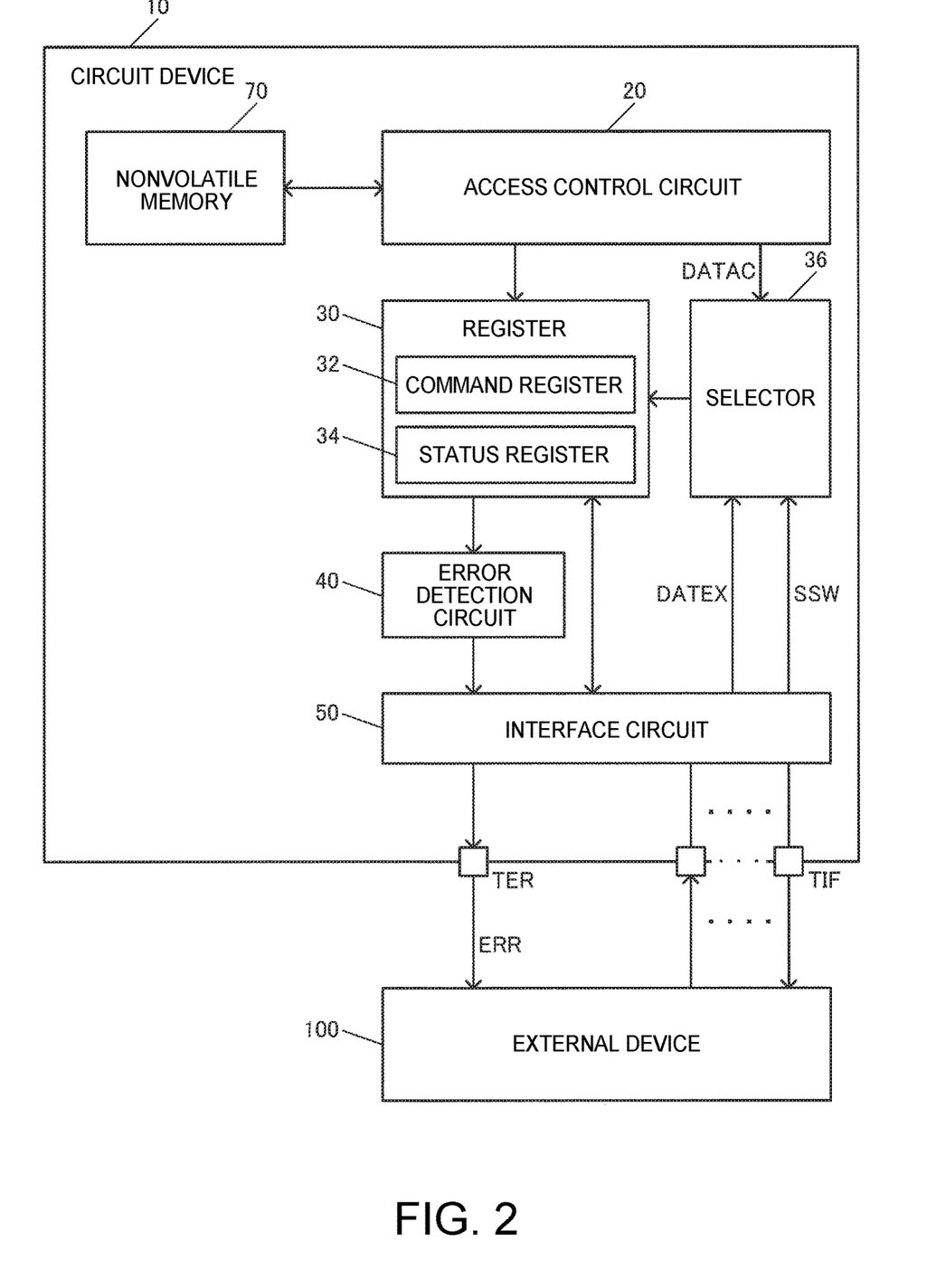
FIG. 2 shows a detailed configuration example of the circuit device of the present embodiment.

Also, the access control circuit 20 stops the refresh operation when an access control error is detected. For example, when an access control error is detected by the error detection circuit 40, the access control circuit 20 stops the refresh operation, which reads the setting data from the nonvolatile memory 70 and reloads that setting data in the register 30. By doing so, after an access control error is detected by the error detection circuit 40, the refresh operation of the register 30 is not performed. Therefore, it is possible to prevent a situation in which due to a malfunction of the nonvolatile memory 70 or the like, or a connection failure, erroneous setting data is reloaded in the register 30, and the circuit device 10 malfunctions based on this erroneous setting data. Note that stopping of the refresh operation may also be realized by inputting an error detection signal from the error detection circuit 40 to the access control circuit 20. For example, when the error detection signal becomes active, the access control circuit 20 stops the refresh operation. Alternatively, as shown in FIG. 2 to be described later, a selector 36 may deactivate the setting data from the access control circuit 20, thereby stopping the refresh operation. Alternatively, when the external device 100 detects the error detection signal ERR, an instruction to stop the refresh operation may be sent from the external device 100 to the access control circuit 20 through the interface circuit 50.

FIG. 2 shows a detailed configuration example of the circuit device 10 of the present embodiment. The circuit device 10 in FIG. 2 includes the interface circuit 50, where setting data DATEX that is external device setting data output by the external device 100 is input, and the selector 36. The setting data DATEX is data for setting the operation and state of the circuit device 10 by the external device 100. The selector 36 selects any of setting data DATAC read from the nonvolatile memory 70 by the access control circuit 20 and the setting data DATEX that is external device setting data input to the interface circuit 50, and outputs the selected data to the register 30. The setting data selected by the selector 36 in this manner is written in the register 30 and stored. For example, the register 30 has a command register 32 and a status register 34, and the setting data selected by the selector 36 is written in the command register 32. The circuit device 10 operates based on the setting data written in the command register 32. For example, the setting data written in the command register 32 can include data indicating a command type, data of command parameters, and the like.

When an access control error is detected, the selector 36 selects the setting data DATEX, which is the external device setting data input to the interface circuit 50. That is, the selector 36 selects the setting data DATEX input from the external device 100 through the interface circuit 50 and outputs it to the register 30, and the register 30 stores the selected setting data DATEX. On the other hand, when an access control error has not been detected, the selector 36 selects the setting data DATAC from the access control circuit 20. That is, the selector 36 selects the setting data DATAC read from the nonvolatile memory 70 by the access control circuit 20 and outputs it to the register 30, and the register 30 stores the selected setting data DATAC. For example, the interface circuit 50 outputs a switching signal SSW based on the result of error detection by the error detection circuit 40. When the switching signal SSW is inactive, the selector 36 selects the setting data DATAC from the access control circuit 20. On the other hand, when an error is detected by the error detection circuit 40 and the switching signal SSW becomes active, the selector 36 selects the setting data DATEX input from the external device 100 to the interface circuit 50.

For example, the interface circuit 50 is electrically coupled to the external device 100 through an interface terminal TIF, which is a pad of the circuit device 10. The interface terminal TIF is, for example, an SPI or I2C terminal. The external device 100 can access the register 30 through the interface terminal TIF, for example, by SPI or I2C interface processing. For example, the external device 100 can write the setting data DATEX to the command register 32 and read status information of the circuit device 10 from the status register 34.

In the present embodiment, when an access control error occurs, the access control circuit 20 performs a refresh operation that writes the setting data DATAC from the nonvolatile memory 70 to the register 30 through the selector 36. On the other hand, when an access control error is detected, a refresh operation of the register 30 is performed by the external device 100, by the external device 100 writing the setting data DATEX to the register 30 through the selector 36. That is, due to the auto-refresh operation by the access control circuit 20, operation switches to the refresh operation by the external device 100 realized by an MPU or the like. By doing so, even when an access control error is detected, it is possible to continue the operation of periodically refreshing the register value of the register 30. Therefore, it is possible to effectively prevent a malfunction of the circuit device 10 due to the rewriting of the register value of the register 30 due to external noise or the like.

The circuit device 10 also includes an error output terminal TER that outputs the error detection signal ERR to the external device 100. The error output terminal TER is a pad of circuit device 10. By providing such an error output terminal TER, it is possible to notify the external device 100 that an error in the access control or the like has occurred. The register 30 stores error status information regarding the access control or the like. Specifically, the status register 34 stores the error status information. The interface circuit 50 outputs the error status information to the external device 100.

Specifically, the external device 100, after being notified that an error has occurred by the error output terminal TER, accesses the register 30 through the interface circuit 50. For example, the external device 100 issues an error status information read command, and reads error status information from the status register 34. Thus, the external device 100 can confirm that an access control error has occurred. Then, the external device 100 accesses the register 30 through the interface circuit 50 and the selector 36, and writes the setting data DATEX to the register 30. For example, the external device 100 issues a write command and writes the setting data DATEX to the register 30. Thus, a refresh operation of the register 30 by the external device 100 instead of the access control circuit 20 is realized. That is, when an auto-refresh malfunction is detected, operation switches to a periodic refresh operation by issuing a write command of the external device 100.

Note that the error detection circuit 40 can perform error detection other than detection of an error in access control. For example, the error detection circuit 40 can perform malfunction detection of a circuit block other than those of the nonvolatile memory 70 and the access control circuit 20. Alternatively, the error detection circuit 40 can detect a status abnormality of an internal logic circuit, detects abnormality of an RGB synchronization signal, or detects abnormality of a display on setting register or a display off setting register. Alternatively, the error detection circuit 40 can detect a connection failure of various signal lines or abnormality of the power supply voltage. The error detection circuit 40 activates the error detection signal ERR when an error is detected in one of such a plurality of error factors. Then, the error detection circuit 40 writes information for identifying the generated error factor in the status register 34. For example, an error flag corresponding to the generated error factor is set to "1" and written in the status register 34. By adopting this sort of configuration, the external device 100, after accessing the register 30 through the interface circuit 50, can judge what sort of error factor caused the generated error. When the external device 100 judges that the error factor is an error in the access control of the nonvolatile memory 70, the external device 100 executes the refresh operation to write the setting data DATEX to the register 30, instead of the access control circuit 20.

Figure 3:
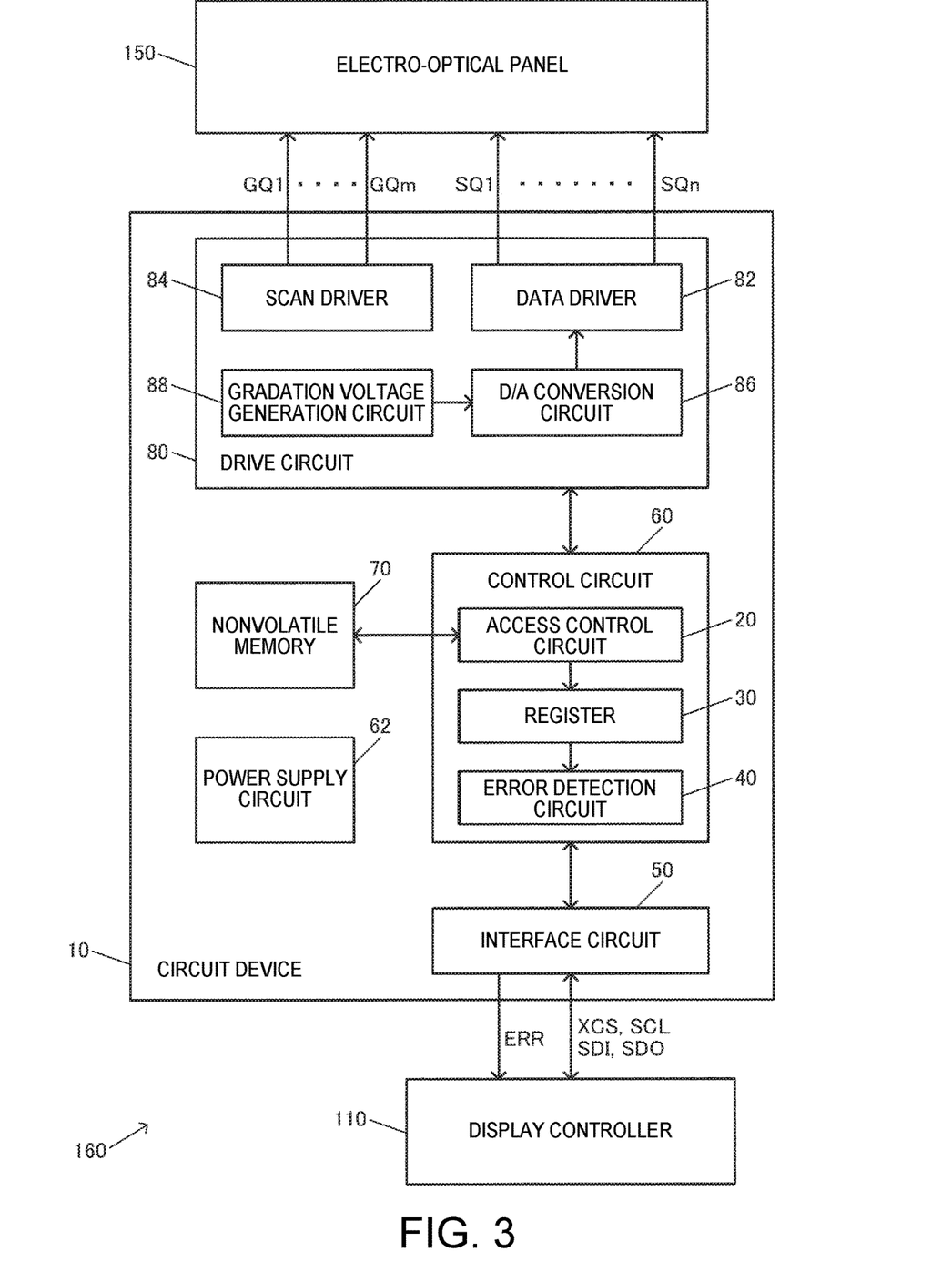
FIG. 3 shows an example of application of the circuit device of the present embodiment to a display driver.

FIG. 3 shows an example of application of the circuit device 10 of the present embodiment to a display driver. In FIG. 3, the circuit device 10 includes a drive circuit 80 that drives an electro-optical panel 150. The circuit device 10 can also include a power supply circuit 62. An electro-optical device 160 is configured from the circuit device 10, which is a display driver, and the electro-optical panel 150. In this case, the setting data written in the register 30 includes setting data for driving the electro-optical panel 150. That is, the setting data written in the register 30 includes setting data for performing a driving operation of the electro-optical panel 150. Here, the setting data for driving the electro-optical panel 150 includes information regarding data lines, the number of scanning lines, and the number of pixels of the electro-optical panel 150, for example. The setting data for driving includes data for setting a driving timing and a control method of the electro-optical panel 150, data for setting gamma characteristics of a gradation voltage, setting data of the power supply voltage generated by the power supply circuit 62, and the like. The setting data of the power supply voltage is a data voltage serving as a source voltage, setting data of a scanning voltage serving as a gate voltage, and the like.

The electro-optical panel 150 is a panel for displaying an image, and can be realized by, for example, a liquid crystal panel or an organic EL panel or the like. As a liquid crystal panel, it is possible to adopt an active matrix-type panel using switch elements such as thin film transistors (TFT). Specifically, the display panel used as the electro-optical panel 150 has a plurality of pixels. For example, the electro-optical panel 150 has a plurality of pixels arranged in a matrix. The electro-optical panel 150 has a plurality of data lines, and a plurality of scanning lines wired in a direction intersecting the plurality of data lines. Each pixel of the plurality of pixels is provided in an area where each data line and each scanning line intersect. In the case of an active matrix-type panel, a switch element such as a thin film transistor is provided in the area of each pixel. The electro-optical panel 150 realizes display operation by changing the optical characteristics of an electro-optical element in the area of each pixel. The electro-optic element is a liquid crystal element, an EL element or the like. Note that in the case of an organic EL panel, a pixel circuit for current-driving the EL element is provided in the area of each pixel.

The circuit device 10 includes a control circuit 60. The control circuit 60 is a logic circuit, and is a circuit realized by automatic placement and routing, such as a gate array, for example. The control circuit 60 includes the access control circuit 20, the register 30, and the error detection circuit 40. Also, the control circuit 60 performs display control of the electro-optical panel 150, control of each circuit block in the circuit device 10, and the like.

The drive circuit 80 includes a data driver 82, a scan driver 84, a D/A conversion circuit 86, and a gradation voltage generation circuit 88. The data driver 82 drives a data line of the electro-optical panel 150. The data line is, for example, a source line. Specifically, the data driver 82 drives the electro-optical panel 150 by outputting data signals SQ1 to SQn, n being an integer of 2 or more, corresponding to display data to the data line of the electro-optical panel 150. The data signal is, for example, a data voltage. For example, the data driver 82 has a plurality of amplifier circuits, and these amplifier circuits output the data signals SQ1 to SQn to the data line of the electro-optical panel 150. Note that a configuration may also be adopted in which a switch element for demultiplexing is provided in the electro-optical panel 150, and each amplifier circuit of the data driver 82 outputs data signals corresponding to a plurality of data lines of the electro-optical panel 150 in a time-divided manner. The scan driver 84 outputs scan signals CQ1 to CQm, m being an integer of 2 or more, and drives a scan line of the electro-optical panel 150. The scan line is, for example, a gate line. Specifically, when selecting each scan line of a plurality of scan lines, the scan driver 84 outputs a selection voltage for a scan signal corresponding to the scan line. Note that, for example, a plurality of scan drivers may be provided, such as a first scan driver for inputting a scan signal from a left side of the electro-optical panel 150 and a second scan driver for inputting a scan signal from a right side of the electro-optical panel 150. Alternatively, a modified embodiment in which the data driver 82 is provided in the drive circuit 80, and the scan driver 84 is not provided, is also possible.

The gradation voltage generation circuit 88, which is a gamma circuit, generates a plurality of gradation voltages and supplies them to the D/A conversion circuit 86. The D/A conversion circuit 86 includes a plurality of D/A converters corresponding to the plurality of amplifier circuits of the data driver 82. Also, the D/A conversion circuit 86 selects a gradation voltage corresponding to display data from the control circuit 60 from among the plurality of gradation voltages from the gradation voltage generation circuit 88, and outputs the selected gradation voltage to the data driver 82. The data driver 82 outputs the selected gradation voltage as a data voltage to each data line. That is, a data voltage, which is a data signal, is output to each data line.

Also, in FIG. 3, the display controller 110 is provided as the external device 100 shown in FIGS. 1 and 2. The display controller 110 may be realized by a dedicated ASIC (Application Specific Integrated Circuit) for performing display control, or may be realized by a processor such as an MPU.

According to the circuit device 10 in FIG. 3, it is possible to realize the refresh operation of the setting data, which is the set value for the display operation of the display driver. Also, in a case where the refresh operation cannot be executed properly due to a malfunction of the nonvolatile memory 70 or the access control circuit 20, or a connection failure of a signal line, or the like, the error detection circuit 40 detects an error in the refresh operation and notifies the display controller 110 of the error using the error detection signal ERR. The display controller 110 confirms that an error in the refresh operation has occurred by accessing the register 30. Then, the display controller 110 executes a refresh operation that writes command setting data in the register 30, instead of executing the auto-refresh operation by the access control circuit 20. By adopting this sort of configuration, even when an error occurs in the refresh operation, the refresh operation can be continued, and driving of the electro-optical panel 150 by the circuit device 10 can be continued. Note that the circuit device 10 of the present embodiment may be a circuit device for an oscillator, or a circuit device for a sensor such as a gyro sensor or an acceleration sensor, or alternatively a circuit device for a communications interface such as USB.

Figure 4:
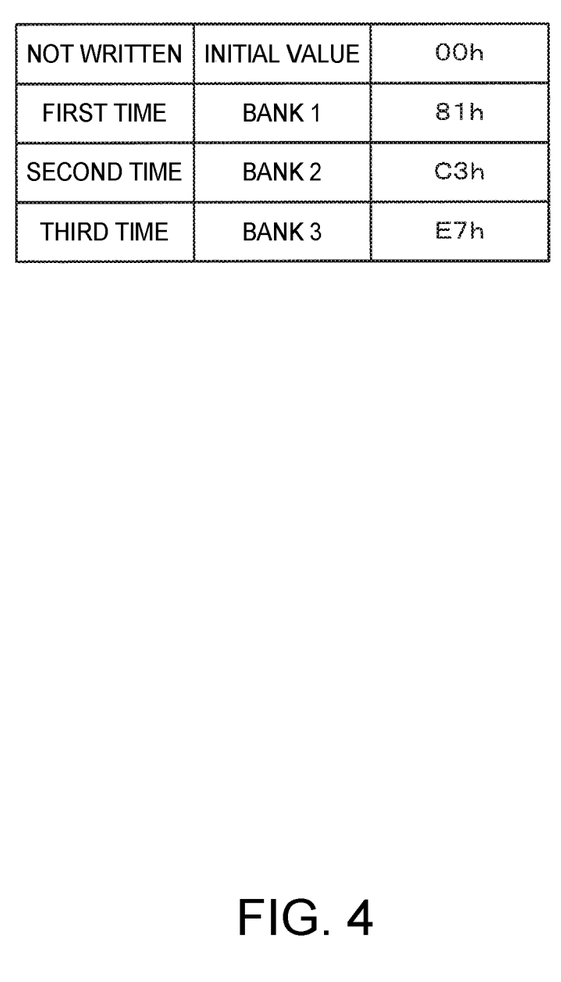
FIG. 4 shows an example of data for comparison.

FIG. 4 shows an example of the data for comparison used in the error detection circuit 40. The data for comparison used in the present embodiment is data set to a different value according to the number of times of writing setting data to the nonvolatile memory 70, for example. Specifically, in FIG. 4, a bank ID is used as the data for comparison. For example, in a state where setting data has not been written to the nonvolatile memory 70, the bank ID is set to ooh, which is an initial value. On the other hand, when setting data has been written once to the nonvolatile memory 70, the bank ID is set to 81h, which represents a bank 1. When setting data has been written twice to the nonvolatile memory 70, the bank ID is set to C3h, which represents a bank 2, and when setting data has been written to the nonvolatile memory 70 three times, the bank ID is set to E7h, which represents a bank 3. Thus, the bank ID, which is the data for comparison, is set to a different value according to the number of times of writing setting data to the nonvolatile memory 70.

The bank ID is data for designating an address of a storage area where setting data is written in the nonvolatile memory 70. This bank ID is written in a bank ID area different from the setting data storage area, for example. At the time of inspection and shipping of a product, the bank ID is updated each time setting data is written to the nonvolatile memory 70. Therefore, as shown in FIG. 4, the value of the bank ID is updated and changed according to the number of times of writing setting data to the nonvolatile memory 70. The access control circuit 20 reads this bank ID from the nonvolatile memory 70, determines the storage area where setting data is written, reads the setting data from the storage area, and writes this setting data to the register 30. When doing so, the bank ID at that time is also written to the register 30. Therefore, when performing the refresh operation, the bank ID is reloaded together with setting data in the register 30.

As shown in FIG. 4, the bank ID is data whose value is uniquely determined according to the number of times of writing setting data to the nonvolatile memory 70. Therefore, the error detection circuit 40 can detect an error in the access control by comparing the bank ID, which is data for comparison, with its expected value. For example, the error detection circuit 40 judges that an access control error has occurred when the bank ID, which is data for comparison that has been reloaded in the register 30, does not match any of 81h, C3h, and E7h, for example. Then, the error detection circuit 40 activates the error detection signal ERR. On the other hand, when the bank ID that has been reloaded in the register 30 matches any of 81h, C3h, and E7h, for example, the access control circuit 20 judges that an access control error has not occurred. In this case, the error detection signal ERR is left inactive. By adopting this sort of configuration, it is possible to realize error detection in which the bank ID is used as the data for comparison, by effectively using the bank ID used to control reading of setting data from the nonvolatile memory 70.

Next, the detailed operation of the circuit device 10 of the present embodiment will be described with reference to the signal waveform diagram of FIG. 5. A signal VSYNC is a signal that becomes active with every vertical synchronization period. In the present embodiment, the refresh operation is performed in every four vertical synchronization periods. Thus it is possible to periodically refresh the register value of the register 30 after power is turned on. A signal REFEND is a signal indicating that the refresh operation has ended. That is, the signal REFEND indicates the end of auto-refresh. RDBKID [7: 0] is the bank ID, which is the data for comparison that has been reloaded in the register 30.

Figure 5:
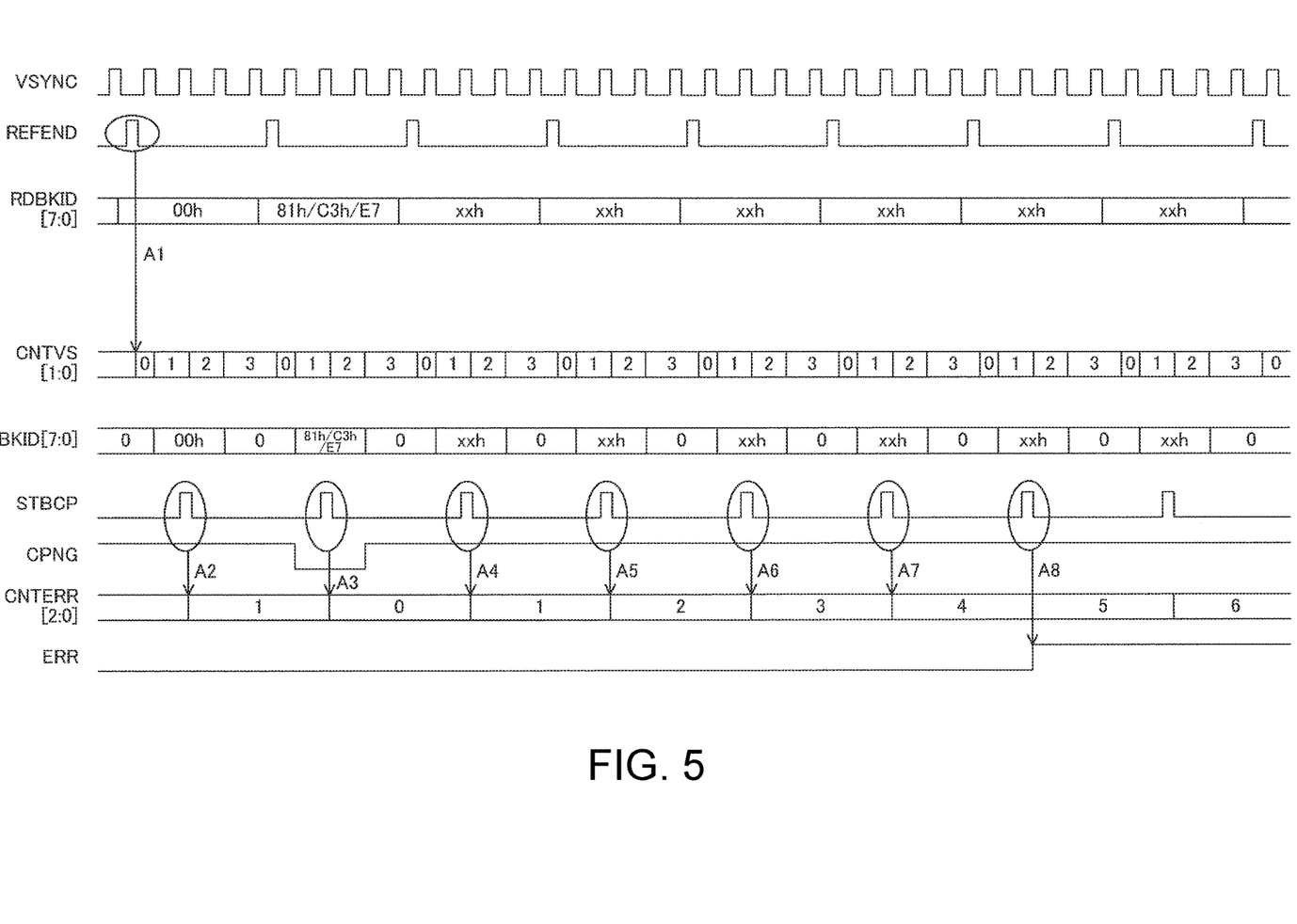
FIG. 5 illustrates operation of the circuit device of the present embodiment.

When the refresh operation ends, a count value CNTVS [1: 0] of a frame counter is reset to 0 as indicated by A1 in FIG. 5. The frame counter is a counter that increases the count value with each vertical synchronization period. In the present embodiment, the refresh operation is performed in every four vertical synchronization periods, so the count value CNTVS [1: 0] is increased as 0, 1, 2, 3, and then reset to 0. When the count value CNTVS [1: 0] is 1 or 2, the error detection circuit 40 reads the bank ID of the register 30 as BKID [7: 0] and copies this to an internal register. Then, the error detection circuit 40 performs comparison processing to determine whether or not BKID [7: 0], which is the data for comparison, matches the expected value. As described in FIG. 4, the expected value is 81h, C3h, or E7h. When the data for comparison BKID [7: 0] does not match the expected value, a signal CPNG is set to an H level, and when the data for comparison BKID [7: 0] matches the expected value, the signal CPNG is set to an L level.

A signal STBCP is a comparison strobe signal that becomes active when the count value CNTVS [1: 0] is 1 and the signal VSYNC is active. CNTERR [2: 0] is the count value of a comparison counter provided in the error detection circuit 40. At A2 in FIG. 5, when the signal STBCP drops, BKID [7: 0] =00h and the expected value (81h, C3h, E7h) do not match and the signal CPNG is at the H level, so the count value CNTERR [2: 0] is increased to 1. On the other hand, at A3, when the signal STBCP drops, BKID [7: 0] matches the expected value and the signal CPNG is at the L level, so the count value CNTERR [2: 0] is reset to 0. Afterward, at A4, A5, A6, and A7 in FIG. 5, BKID [7: 0] and the expected value do not match, so the count value CNTERR [2: 0] is increased. At A8, the count value CNTERR [2: 0] has reached 5, so the error detection circuit 40 sets the error detection signal ERR to the H level, which is the active level, and outputs this signal. In this way, the error detection circuit 40 judges that an error has occurred in the access control when determined a plurality of times that the data for comparison and the expected value do not match.

In this way, the error detection circuit 40 judges that an error has occurred in the access control when determined a plurality of times that the data for comparison and the expected value do not match. By adopting this sort of configuration, even when erroneously determined that the data for comparison and the expected value do not match due to noise, power supply fluctuation, or the like, the error detection circuit 40 does not immediately judge there to be an error in the access control, so access control error detection can be performed in a stable manner.

Figure 6:
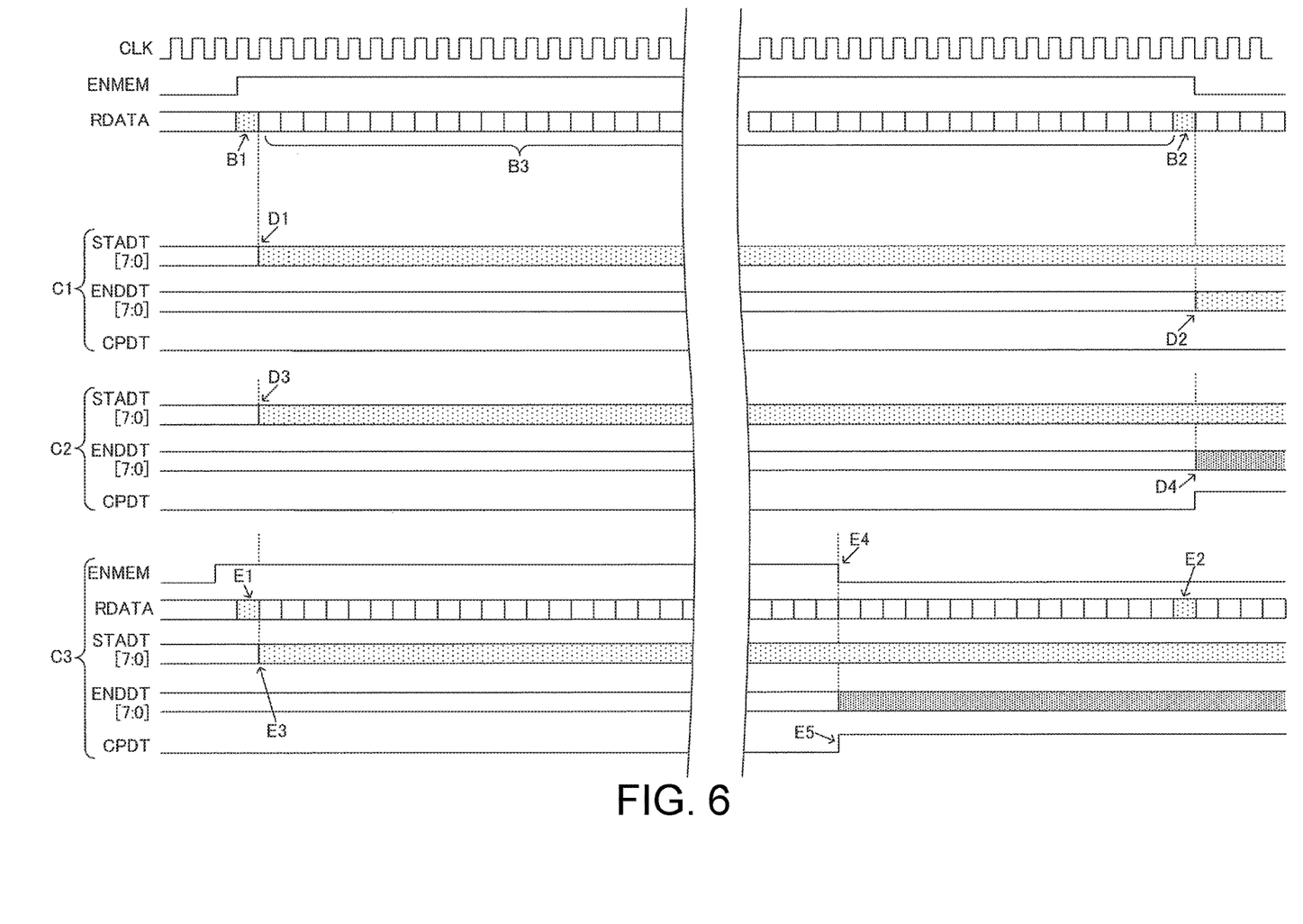
FIG. 6 illustrates operation of the circuit device of the present embodiment.

FIG. 6 illustrates operation of the present embodiment when another technique of error detection is used. A signal CLK is a clock signal, and a signal ENMEM is an enable signal of the nonvolatile memory 70. The signal ENMEM becomes an H level signal, which is the active level, during operation of the nonvolatile memory 70. RDATA is read data from the nonvolatile memory 70.

The nonvolatile memory 70 stores first data for comparison shown at B1 as the data for comparison, and stores first to k-th setting data, k being an integer of 2 or more, shown at B3 as the setting data. In the refresh operation, the access control circuit 20 reloads the first data for comparison shown at B1 from the nonvolatile memory 70 to the register 30, and after reloading the first data for comparison, reloads the first to k-th setting data shown at B3 from the nonvolatile memory 70 to the register 30. The error detection circuit 40 detects an error in the access control by comparing the first data for comparison that has been reloaded in the register 30 with the expected value of the first data for comparison. By adopting this sort of configuration, an error in the access control can be detected using the first data for comparison written at the beginning of the register 30, shown at B1, so appropriate error detection can be realized.

Also, in FIG. 6, the nonvolatile memory 70 stores second data for comparison shown at B2. In the refresh operation, the access control circuit 20 reloads the second data for comparison shown at B2 from the nonvolatile memory 70 to the register 30 after the first to k-th setting data shown at B3 are reloaded. The error detection circuit 40 detects an error in the access control by comparing the second data for comparison that has been reloaded in the register 30 with the expected value of the second data for comparison. By adopting this sort of configuration, an error in the access control can be detected using the first data for comparison shown at B1 that is first reloaded in the register 30 and the second data for comparison shown at B2 that was last reloaded in the register 30. Thus, even when an error occurs during the refresh operation and the refresh operation is interrupted, it is possible to detect that error, so more appropriate error detection can be realized.

For example, C1 in FIG. 6 shows a signal waveform diagram in a case where the first and second data for comparison and the corresponding expected value match, and C2 shows a signal waveform diagram in a case where the first and second data for comparison and the corresponding expected value do not match. At D1 in FIG. 6, a first data for comparison STADT [7: 0] stored in the register 30 is read into the internal register of the error detection circuit 40, and comparison processing is performed to compare the first data for comparison STADT [7: 0] with its expected value, and it is judged that they match. At D2, a second data for comparison ENDDT [7: 0] stored in the register 30 is read into the internal register of the error detection circuit 40, and comparison processing is performed to compare the first data for comparison STADT [7: 0] with its expected value, and it is judged that they match. Therefore, in this case, a signal CPDT indicating the comparison result becomes an L level signal, and it is judged that an error has not occurred.

On the other hand, at D3 in FIG. 6, the first data for comparison STADT [7: 0] matches the expected value, but at D4, it is judged that the second data for comparison ENDDT [7: 0] does not match the expected value. Therefore, in this case, the signal CPDT indicating the comparison result becomes an H level signal, and it is judged that an error has occurred.

C3 in FIG. 6 shows a signal waveform diagram in a case where an error occurs during the refresh operation and the refresh operation is interrupted. E1 and E2 are first and second data for comparison, and at E3 it is judged that the first data for comparison matches the expected value. At E4, the signal ENMEM changes from an H level signal to an L level signal and is inactive, and the refresh operation is interrupted during the operation. In this case, the comparison processing to compare the second data for comparison with the expected value shown at E2 is not performed, so as shown at E5, the signal CPDT becomes an H level signal, and it is judged that an error has occurred. For example, the error detection signal ERR is generated using the signal CPDT, and the external device 100 is informed that an error has occurred in the auto-refresh operation.

As described above, according to the error detection technique shown in FIG. 6, even when an error occurs during the refresh operation and the refresh operation is interrupted, it is possible to appropriately judge that an error has occurred, and detect a malfunction in the auto-refresh operation. Note that, as the first and second data for comparison indicated by B1, B2, E1 and E2 in FIG. 6, a bank ID may be used, or another type of data may be used. Also, in FIG. 6, as in FIG. 5, it may be judged that an error has occurred in the access control when determined a plurality of times that the first and second data for comparison and the expected value do not match.

Figure 7:
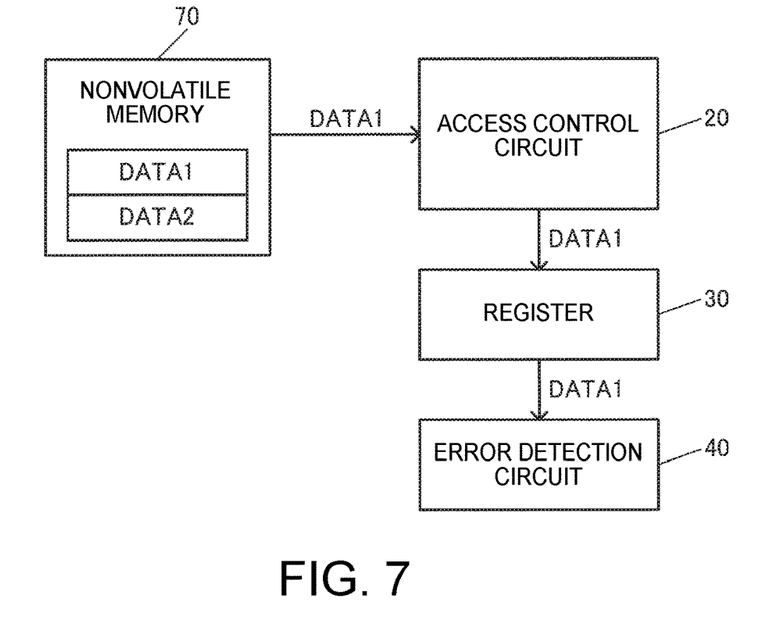
FIG. 7 illustrates a modified example of an error detection technique.
Figure 8:
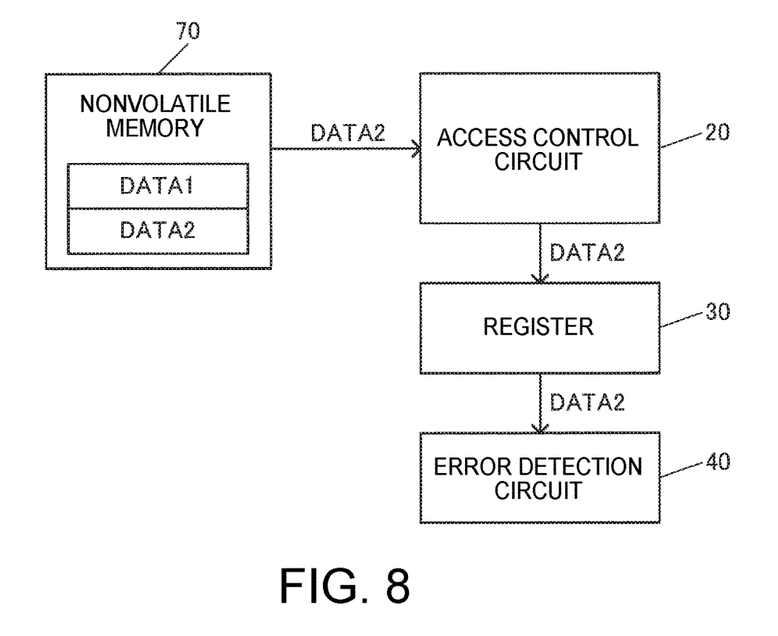
FIG. 8 illustrates a modified example of an error detection technique.

FIGS. 7 and 8 illustrate an error detection technique of a modified example of the present embodiment. In FIGS. 7 and 8, the nonvolatile memory 70 stores, as the data for comparison, first data DATA1 and second data DATA2 having a different value than the first data DATA1. The first data DATA1 and the second data DATA2 are data in which the logic level of each bit is different. As shown in FIG. 7, the access control circuit 20, in a first refresh operation, reloads the first data DATA1 from the nonvolatile memory 70 to the register 30. On the other hand, as shown in FIG. 8, in a second refresh operation after the first refresh operation, the access control circuit 20 reloads the second data DATA2 from the nonvolatile memory 70 to the register 30. The first refresh operation is a refresh operation performed in a first refresh period, and the second refresh operation is a refresh operation performed in a second refresh period following the first refresh period. For example, when a refresh operation is performed in every four vertical synchronization periods as shown in FIG. 5, the first refresh operation is a refresh operation performed in the first refresh period, which corresponds to first to fourth vertical synchronization periods. The second refresh operation is a refresh operation performed in the second refresh period, which corresponds to fifth to eighth vertical synchronization periods following the first to fourth vertical synchronization periods.

As shown in FIG. 7, when the first data DATA1 has been reloaded in the register 30 as shown in FIG. 7, the error detection circuit 40 compares the first data DATA1 with the expected value of the first data DATA1, and performs detection of an error in the access control. That is, in the first refresh period in which the first refresh operation is performed, a malfunction in the refresh operation is detected based on the comparison of the first data DATA1 with its expected value. As shown in FIG. 8, when the second data DATA2 has been reloaded in the register 30 as shown in FIG. 8, the error detection circuit 40 compares the second data DATA2 with the expected value of the second data DATA2, and performs detection of an error in the access control. That is, in the second refresh period in which the second refresh operation is performed, a malfunction in the refresh operation is detected based on the comparison of the second data DATA2 with its expected value. According to this sort of configuration, the first data DATA1 and the second data DATA2 are stored in the nonvolatile memory 70, and with simple processing in which the first data DATA1 and the second data DATA2 are used to detect whether or not all setting data has been appropriately reloaded in the register 30, it is possible to detect a malfunction in the refresh operation.

As a specific example of the error detection technique in FIG. 7, for example, "0" which is the first data DATA1, and "1" which is the second data DATA2, are written in a predetermined storage area of the nonvolatile memory 70. Then, the values "0" and "1" are reloaded from the nonvolatile memory 70 to the register 30 and written as register values in each refresh operation. Then, the error detection circuit 40 reads the values "0" and "1" that have been reloaded in the register 30, and performs error detection. When the register values that were sequentially read from the register 30 are "0", "1", "0", "1", . . . , it is judged that no error has occurred in the auto-refresh operation, and operation is normal. On the other hand, when the register values that were sequentially read from the register 30 are "0", "0", "0", "0", . . . , or "1", "1", "1" "1" . . . , it is judged that an error has occurred in the auto-refresh operation. Therefore, with a simple configuration of merely writing "0" which is the first data DATA1, and "1" which is the second data DATA2, in the nonvolatile memory 70, and loading these in the register 30 when performing the refresh operation, it is possible to detect an auto-refresh malfunction with a simple operation.

2. Electronic Device and Mobile Body

Figure 9:
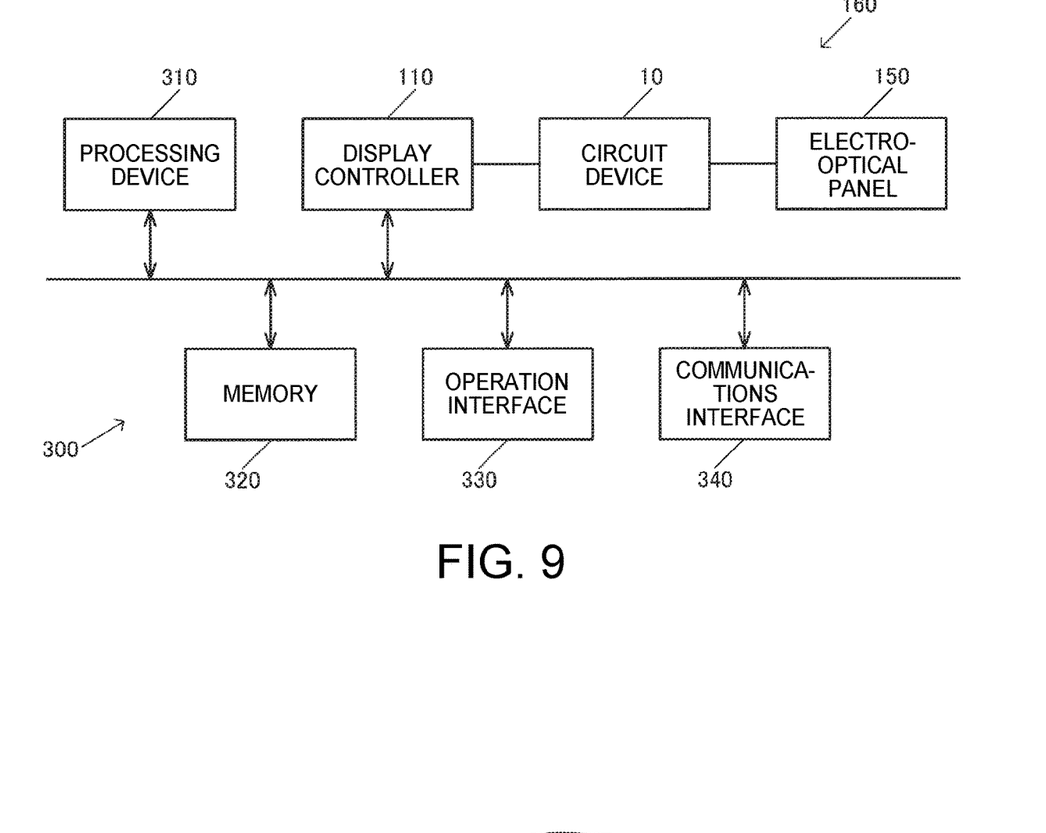
FIG. 9 shows a configuration example of an electronic device of the present embodiment.

FIG. 9 shows a configuration example of the electronic device 300 including the circuit device 10 of the present embodiment. The electronic device 300 includes the circuit device 10 of the present embodiment, the electro-optical panel 150, the display controller 110, a processing device 310, a memory 320, an operation interface 330, and a communications interface 340. The electro-optical device 160 is configured from the circuit device 10, which is a display driver, and the electro-optical panel 150. Specific examples of the electronic device 300 include various electronic devices, for example, such as a panel device such as an instrument panel or an in-vehicle device such as a car navigation system, a projector, a head mounted display, a printing device, a portable information terminal, a portable game terminal, a robot, or alternatively an information processing device.

The processing device 310 performs control processing of the electronic device 300, various signal processing, and the like. The processing device 310 can be realized, for example, by a processor such as a CPU or an MPU, or alternatively an ASIC or the like. The memory 320 for example, stores data from the operation interface 330 and the communications interface 340, or alternatively functions as a work memory of the processing device 310. The memory 320 can be realized, for example, by a semiconductor memory such as a RAM or ROM, or alternatively by a magnetic storage device such as a hard disk drive. The operation interface 330 is a user interface that accepts various operation from a user. For example, the operation interface 330 can be realized by a button, a mouse, or a keyboard, or alternatively by a touch panel or the like attached to the electro-optical panel 150. The communications interface 340 is an interface that communicates image data or control data. Communications processing of the communications interface 340 may be wired communications processing or wireless communications processing.

Figure 10:
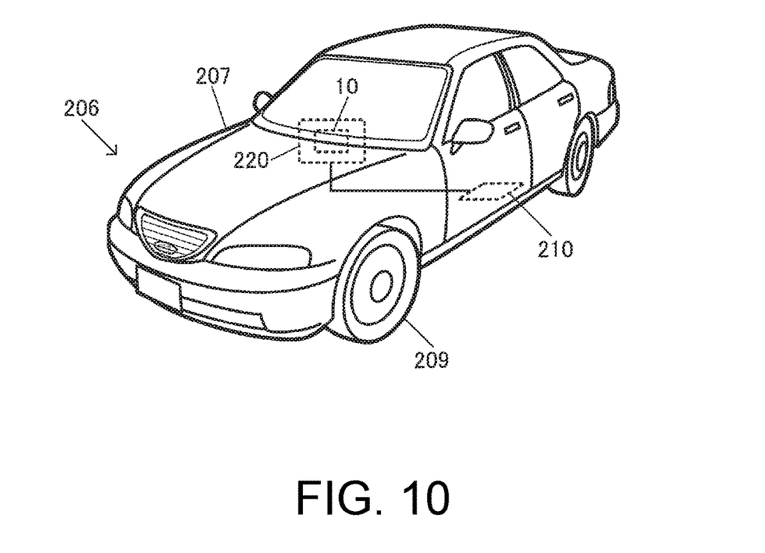
FIG. 10 shows a configuration example of a mobile body of the present embodiment.

FIG. 10 shows a configuration example of a mobile body including the circuit device 10 of the present embodiment. The mobile body is, for example, a device or apparatus that moves on the ground, in the sky, or the sea, and is provided with a drive mechanism such as an engine or a motor, a steering mechanism such as a steering wheel or a rudder, and various electronic devices. As the mobile body of the present embodiment, it is possible to assume, for example, a car, an airplane, a motorcycle, a ship, or alternatively a robot or the like. FIG. 10 schematically shows an automobile 206 as a specific example of the mobile body. The vehicle 206 has a vehicle body 207 and wheels 209. The automobile 206 includes a display device 220 having the circuit device 10, and a control device 210 controlling each part of the automobile 206. The control device 210 can include, for example, an ECU (Electronic Control Unit) or the like. The display device 220 is realized by the electro-optical device 160 and is, for example, a panel device such as an instrument panel. The control device 210 generates an image to be presented to the user, and transmits the image to the display device 220. The display device 220 displays the received image in a display unit of the display device 220. For example, information such as vehicle speed, fuel remaining amount, traveling distance, settings of various devices, and the like are displayed as images.

As described above, a circuit device of the present embodiment includes a register, an access control circuit that controls access to a nonvolatile memory and loads setting data of the circuit device stored in the nonvolatile memory in the register, and an error detection circuit. The access control circuit performs a refresh operation that reloads the setting data stored in the nonvolatile memory in the register. The error detection circuit reads data for comparison that has been reloaded in the register from the register, compares the data for comparison that was read with an expected value of the data for comparison, and performs access control error detection based on the comparison result.

According to the circuit device of the present embodiment, a refresh operation is realized in which, after the setting data stored in the nonvolatile memory is loaded into the register, the setting data is reloaded in the register. Thus, even when the setting data of the register is rewritten due to noise or the like, it is possible to reload the setting data in the register by the refresh operation and operate the circuit device normally. Also, in the present embodiment, access control error detection is performed by comparing the data for comparison that has been reloaded in the register with the expected value of that data for comparison. By adopting this sort of configuration, an abnormality in the refresh operation can be detected by the error detection circuit, and it is possible to prevent a malfunction or the like of the circuit device that is caused by an abnormality in the refresh operation.

Also, in the present embodiment, the access control circuit may stop the refresh operation when an error has been detected in the access control.

By adopting this sort of configuration, it is possible to prevent a situation in which the refresh operation is performed even though an error has occurred in the access control, and the circuit device operates based on the erroneous setting data.

Also, the circuit device of the present embodiment may include an interface circuit where external device setting data that was output by an external device is input, and a selector that selects any of setting data that was read from the nonvolatile memory by the access control circuit and external device setting data that was input to the interface circuit, and outputs the selected data to the register. Also, when an error has been detected in the access control, the selector may select the external device setting data that was input to the interface circuit.

By adopting this sort of configuration, when an error has been detected in the access control, rather than the setting data that was read from the nonvolatile memory, the external device setting data that was input to the interface circuit is selected and output to the register. Therefore, it is possible to set the external device setting data that was output by the external device in the register, and operate the circuit device.

Also, a configuration may be adopted in which the circuit device of the present embodiment includes an error output terminal that outputs an error detection signal to the external device, the register stores error status information, and the interface circuit outputs the error status information to the external device.

By adopting this sort of configuration, it is possible to notify the external device of detection of an error in the access control using the error detection signal. Also, by outputting the error status information stored in the register to the external device through the interface circuit, it is possible to allow the external device to confirm the cause of the detected error.

Also, in the circuit device of the present embodiment, the data for comparison may be data set to a different value according to the number of times of writing the setting data to the nonvolatile memory.

By adopting this sort of configuration, it is possible to perform error detection by effectively using data for identifying the number of times of writing as the data for comparison.

Also, in the circuit device of the present embodiment, the error detection circuit may judge that an error has occurred in the access control when determined a plurality of times that the data for comparison and the expected value of the data for comparison do not match.

By adopting this sort of configuration, even when erroneously determined that the data for comparison and the expected value do not match due to noise or the like, there is not immediately judged to be an error in the access control, so access control error detection can be performed in a stable manner.

Also, in the circuit device of the present embodiment, the nonvolatile memory may store a first data for comparison as the data for comparison, and store first to k-th setting data, k being an integer of 2 or more, as the setting data. Also, a configuration may be adopted in which, in the refresh operation, the access control circuit reloads the first data for comparison from the nonvolatile memory to the register, and after reloading the first data for comparison, reloads the first to k-th setting data from the nonvolatile memory to the register. The error detection circuit may compare the first data for comparison that has been reloaded in the register with the expected value of the first data for comparison.

By adopting this sort of configuration, an error in the access control can be judged using the first data for comparison that is reloaded first in the register, so appropriate error detection can be realized.

Also, in the circuit device of the present embodiment, a configuration may be adopted in which the nonvolatile memory stores second data for comparison, in the refresh operation, the access control circuit reloads the second data for comparison from the nonvolatile memory to the register after the first to k-th setting data are reloaded, and the error detection circuit compares the second data for comparison that has been reloaded in the register with the expected value of the second data for comparison.

By adopting this sort of configuration, even when an error occurs during the refresh operation and the refresh operation is interrupted, it is possible to detect that error, so more appropriate error detection can be realized.

Also, in the circuit device of the present embodiment, a configuration may be adopted in which the nonvolatile memory stores, as the data for comparison, first data and second data having a different value than the first data, and the access control circuit, in a first refresh operation that is the refresh operation, reloads the first data from the nonvolatile memory to the register, and in a second refresh operation after the first refresh operation, reloads the second data from the nonvolatile memory to the register. A configuration may also be adopted in which the error detection circuit compares the first data with the expected value of the first data when the first data has been reloaded in the register, and compares the second data with the expected value of the second data when the second data has been reloaded in the register.

By adopting this sort of configuration, the first data and the second data are stored in the nonvolatile memory, and with simple processing that detects whether or not the first data and the second data have been appropriately reloaded in the register, it is possible to detect an error in the access control.

Also, a configuration may be adopted in which the circuit device of the present embodiment includes a drive circuit that drives an electro-optical panel, and the setting data includes setting data for driving the electro-optical panel.

Also, an electronic device of the present embodiment may include the above-described circuit device. Also, a mobile body of the present embodiment may include the above-described circuit device.

Note that although this embodiment has been described in detail above, it will be easily understood by those skilled in the art that many modifications that do not substantially deviate from novel matters and effects of the disclosure are possible. Accordingly, all such modifications are encompassed by the disclosure. For example, in the specification or the drawings, a term described at least once together with a different term having a broader or equivalent meaning can be replaced with the different term at any point in the specification or the drawings. Also, all combinations of this embodiment and modifications are encompassed by the disclosure. Also, the configuration, operation, and the like of the circuit device, the electronic device, the mobile body, and the like are not limited to those described in this embodiment, and various modified embodiments are possible.

What is claimed is:

1. A circuit device, comprising:
    a register;
    an access control circuit that controls access to a nonvolatile memory and loads setting data of the circuit device stored in the nonvolatile memory in the register; and
    an error detection circuit, wherein
    the access control circuit performs a refresh operation that reloads the setting data stored in the nonvolatile memory in the register, and
    the error detection circuit reads data for comparison that has been reloaded in the register from the register, compares the data for comparison that was read with an expected value of the data for comparison which is stored in the error detection circuit, and performs access control error detection based on the comparison result.

2. The circuit device according to claim 1, wherein the access control circuit stops the refresh operation when an error has been detected in an access control.

3. The circuit device according to claim 1, comprising: an interface circuit where external device setting data that was output by an external device is input; and a selector that selects any of setting data that was read from the nonvolatile memory by the access control circuit and external device setting data that was input to the interface circuit, and outputs the selected setting data to the register, wherein when an error has been detected in an access control, the selector selects the external device setting data that was input to the interface circuit.

4. The circuit device according to claim 3, comprising:
    an error output terminal that outputs an error detection signal to the external device, wherein
    the register stores error status information, and
    the interface circuit outputs the error status information to the external device.

5. The circuit device according to claim 1, wherein
the data for comparison is data set to a different value according to the number of times of writing the setting data to the nonvolatile memory.

6. The circuit device according to claim 1, wherein
the error detection circuit judges that an error has occurred in the access control when determined a plurality of times that the data for comparison and the expected value of the data for comparison do not match.

7. The circuit device according to claim 1, wherein
the nonvolatile memory stores first data for comparison as the data for comparison, and stores first to k-th setting data, k being an integer of 2 or more, as the setting data, and in the refresh operation, the access control circuit reloads the first data for comparison from the nonvolatile memory to the register, and after reloading the first data for comparison, reloads the first to k-th setting data from the nonvolatile memory to the register, and the error detection circuit compares the first data for comparison that has been reloaded in the register with the expected value of the first data for comparison.

8. The circuit device according to claim 7, wherein
the nonvolatile memory stores second data for comparison, and in the refresh operation, the access control circuit reloads the second data for comparison from the nonvolatile memory to the register after the first to k-th setting data are reloaded, and the error detection circuit compares the second data for comparison that has been reloaded in the register with the expected value of the second data for comparison.

9. The circuit device according to claim 1, wherein
the nonvolatile memory stores, as the data for comparison, first data and second data having a different value than the first data, and the access control circuit, in a first refresh operation that is the refresh operation, reloads the first data from the nonvolatile memory to the register, and in a second refresh operation after the first refresh operation, reloads the second data from the nonvolatile memory to the register, and the error detection circuit compares the first data with the expected value of the first data when the first data has been reloaded in the register, and compares the second data with the expected value of the second data when the second data has been reloaded in the register.

10. The circuit device according to claim 1, comprising:
a drive circuit that drives an electro-optical panel, wherein the setting data includes setting data for driving the electro-optical panel.

11. An electronic device, comprising:
the circuit device according to claim 1.

12. A mobile body, comprising:
the circuit device according to claim 1.

13. A circuit device, comprising: a register; an access control circuit that controls access to a nonvolatile memory and loads setting data of the circuit device stored in the nonvolatile memory in the register; and an error detection circuit, wherein the access control circuit performs a refresh operation that reloads the setting data stored in the nonvolatile memory in the register, and the error detection circuit reads data for comparison that has been reloaded in the register from the register, compares the data for comparison that was read with an expected value of the data for comparison which is stored in the error detection circuit, and performs access control error detection based on the comparison result, and the data for comparison is data set to a different value according to the number of times of writing the setting data to the nonvolatile memory.

14. The circuit device according to claim 13, wherein
the access control circuit stops the refresh operation when an error has been detected in an access control.

15. The circuit device according to claim 13, comprising:
an interface circuit where external device setting data that was output by an external device is input; and a selector that selects any of setting data that was read from the nonvolatile memory by the access control circuit and external device setting data that was input to the interface circuit, and outputs the selected setting data to the register, wherein when an error has been detected in an access control, the selector selects the external device setting data that was input to the interface circuit.

16. The circuit device according to claim 15, comprising:
an error output terminal that outputs an error detection signal to the external device, wherein
the register stores error status information, and
the interface circuit outputs the error status information to the external device.

17. The circuit device according to claim 13, wherein
the error detection circuit judges that an error has occurred in the access control when determined a plurality of times that the data for comparison and the expected value of the data for comparison do not match.

18. The circuit device according to claim 13, comprising:
a drive circuit that drives an electro-optical panel, wherein the setting data includes setting data for driving the electro-optical panel.

19. An electronic device, comprising:
the circuit device according to claim 13.

20. A mobile body, comprising:
the circuit device according to claim 13.

* * * * *